United States Patent
Leibl

(10) Patent No.: US 9,027,945 B2
(45) Date of Patent: May 12, 2015

(54) AXLE BRACKET FOR A MOTOR VEHICLE

(71) Applicant: Audi AG, Ingolstadt (DE)

(72) Inventor: Peter Leibl, Manching (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/057,350

(22) Filed: Oct. 18, 2013

(65) Prior Publication Data

US 2014/0110916 A1 Apr. 24, 2014

(30) Foreign Application Priority Data

Oct. 19, 2012 (DE) .......................... 10 2012 020 612

(51) Int. Cl.
*B62D 21/11* (2006.01)

(52) U.S. Cl.
CPC ...................................... *B62D 21/11* (2013.01)

(58) Field of Classification Search
CPC ..................... B60G 2204/19; B60G 2204/143; B60G 2204/15; B60G 2204/4302; B60G 2206/604; B60G 2206/60; B62D 21/11; B62D 21/09; B60K 17/16
USPC ................. 180/311, 312, 377, 378, 375, 374; 280/124.109, 124.166
See application file for complete search history.

(56) References Cited

U.S. PATENT DOCUMENTS

| | | | | |
|---|---|---|---|---|
| 4,184,697 | A | * | 1/1980 | Suzuki et al. .......... 280/124.109 |
| 4,213,632 | A | * | 7/1980 | Stotz et al. ............. 280/124.108 |
| 4,501,436 | A | * | 2/1985 | Ishida .................... 280/124.108 |
| 4,887,841 | A | * | 12/1989 | Cowburn et al. ....... 280/124.109 |
| 6,269,902 | B1 | * | 8/2001 | Miyagawa .................... 180/312 |
| 6,648,351 | B1 | * | 11/2003 | Kosak .................... 280/124.109 |
| 6,742,808 | B1 | * | 6/2004 | Kosak .......................... 280/781 |
| 7,946,377 | B2 | | 5/2011 | Frasch et al. |
| 8,371,595 | B2 | * | 2/2013 | Taneda et al. .......... 280/124.109 |
| 2006/0131829 | A1 | * | 6/2006 | Alesso et al. ........... 280/124.166 |
| 2013/0009375 | A1 | * | 1/2013 | Tanaka et al. .......... 280/124.109 |

FOREIGN PATENT DOCUMENTS

| | | |
|---|---|---|
| DE | 102006013547 | 9/2007 |
| DE | 102006013550 | 9/2007 |
| DE | 102006013548 | 10/2007 |
| DE | 102008010551 | 8/2009 |
| DE | 102009029883 | 12/2010 |
| DE | 102010033333 | 2/2012 |

\* cited by examiner

*Primary Examiner* — Drew Brown
(74) *Attorney, Agent, or Firm* — Henry M. Feiereisen LLC

(57) ABSTRACT

An axle bracket for a front axle or rear axle of a motor vehicle includes two side members and at least one cross member interconnecting the side members and having at least one attachment point for attachment of a drive component, wherein during travel an operating force can be introduced from the drive component via the attachment point to the cross member. The cross member is constructed as a hollow profile of downwardly open U-shaped configuration to define a hollow space bounded by an upper top wall and two sidewalls depending downwards from the top wall. The cross member has a bearing site configured for securement of a stiffening element such that the stiffening element is arranged, at least in part, in the hollow space of the cross member, for increasing a strength of the cross member.

24 Claims, 5 Drawing Sheets

US 9,027,945 B2

AXLE BRACKET FOR A MOTOR VEHICLE

CROSS-REFERENCES TO RELATED APPLICATIONS

This application claims the priority of German Patent Application, Serial No. 10 2012 020 612.7 filed Oct. 19, 2012, pursuant to 35 U.S.C. 119(a)-(d), the disclosure of which is incorporated herein by reference in its entirety as if fully set forth herein.

BACKGROUND OF THE INVENTION

The present invention relates to an axle bracket for a motor vehicle.

The following discussion of related art is provided to assist the reader in understanding the advantages of the invention, and is not to be construed as an admission that this related art is prior art to this invention.

Axle brackets are typically threadably secured with the vehicle body via respective attachment points. The axle brackets may find application in both the are of the front axles and the area of the rear axle. A transmission unit and/or electric motor can be mounted to the rear axle between side members and cross members of the axle bracket, with additional mounting being provided on the side members of the axle bracket for wheel guide elements.

In large-scale production of a model series, same axle brackets are installed, regardless of the respectively selected motorization. As a result, the axle bracket is dimensioned to suit operating forces encountered at maximum drive torque and thus highest possible motorization. This in turn means that the cross member to which the rear axle differential is mounted has a substantial material thickness which is evidently oversized, when vehicles of lesser motorization are involved. The proposal to provide therefore axle brackets of different dimensions to accommodate vehicles with different motorization is not viable for economic reasons.

It would therefore be desirable and advantageous to address this problem and to provide an improved axle bracket which obviates other prior art shortcomings.

SUMMARY OF THE INVENTION

According to one aspect of the present invention, an axle bracket for a front axle or rear axle of a motor vehicle includes two side members, and at least one cross member interconnecting the side members and having at least one attachment point for attachment of a drive component, wherein during travel an operating force is introducible from the drive component via the attachment point to the cross member, the cross member constructed as a hollow profile of downwardly open U-shaped configuration to define a hollow space bounded by an upper top wall and two sidewalls depending downwards from the top wall, the cross member having a bearing site configured for securement of a stiffening element such that the stiffening element is arranged, at least in part, in the hollow space of the cross member, for increasing a strength of the cross member.

The present invention is based on the idea to provide a basic configuration of an axle bracket which can be installed irrespective of the motorization of the motor vehicle. When the situation warrants, the basic axle bracket can be supplemented like a modular design by attaching the stiffening element. In other words, at lower motorization of the vehicle, the axle bracket can be installed without stiffening element, and at greater motorization of the vehicle, the axle bracket can be installed with the stiffening element.

For weight reasons, the cross member is configured as a hollow profile, with the stiffening element being accommodated, at least in part, in the hollow space. In this way, the stiffening element can be arranged in an effective manner by utilizing available installation space, without experiencing package problems outside of the hollow cross member.

According to another advantageous feature of the present invention, the stiffening element can be configured as a transverse strut.

According to another advantageous feature of the present invention, the stiffening element can extend continuously in the hollow space.

During normal travel, the cross member to which the drive component is mounted, provides a load path via which the operating forces can be introduced into the side members. The presence of the stiffening element provides an additional load path via which the operating forces can be introduced into the side members. As a result, the cross member can be relieved in terms of force application.

An axle bracket for a rear axle of a motor vehicle may, for example, have a leading cross member and a trailing cross member, respectively connected to the two side members. As a result, a closed frame is realized in which the rear axle differential and/or an electric motor can be mounted for example. The side members and the cross members may be connected to one another in a force-transmitting manner via corner pieces. The side members may further be provided with additional mountings for wheel guide elements as well as with attachment points upon the vehicle body.

According to another advantageous feature of the present invention, the stiffening element can be mounted to the cross member at at least one nodal point at a location where an end of the stiffening element converges with the cross member. The location of the nodal point can be inwardly offset in transverse travel direction by a transverse offset in relation to an adjacent one of the corner pieces. As a result, the nodal point or nodal points are thus not situated at a same location as the outer corner pieces but rather disposed in midsection of the cross member where operating forces are introduced into the cross member during travel. Depending on size, the stiffening element can be attached at two outer nodal points, as viewed in transverse vehicle direction, to the cross member. To further enhance reinforcement, at least one further nodal point may be provided for securement of the stiffening element to the cross member and arranged between the two outer nodal points. Through appropriate disposition and/or number of nodal points, the natural frequency of the axle bracket can be influenced.

According to another advantageous feature of the present invention, the attachment point can be positioned in transverse travel direction between two spaced-apart nodal points to which the end of the stiffening element can be secured to the cross member.

According to another advantageous feature of the present invention, the bearing site can be a screw hole formed in the cross member, with the stiffening element being threadably engaged in the screw hole for securement to the cross member. Advantageously, by realizing the bearing site as a screw hole, the presence of a bulky mounting or the like is avoided. When a vehicle is involved that has low motorization, the weight thereof is not adversely affected by unnecessary mountings that are formed on the cross member.

According to another advantageous feature of the present invention, each of the sidewalls of the U-shaped cross member can have a screw hole for securement of the stiffening element to the cross member. The stiffening element can be mounted to the cross member by using mounting pieces respectively arranged at the two ends of the stiffening element and insertable into the hollow space of the cross member and threadably engaged in the screw holes of the cross member. The mounting pieces of the stiffening element may include tubular lugs for example which can be arranged in assembled state between the two sidewalls of the cross members.

According to another aspect of the present invention, a method of mounting an axle bracket to a front axle or rear axle of a motor vehicle includes mounting two side members and at least one cross member, which is configured as a hollow profile of downwardly open U-shaped configuration, to form a frame, and installing the frame in one of two ways, a first way in which the frame is installed in a basic version of the motor vehicle in the absence of a stiffening element, a second way in which the frame is complemented by a stiffening element which is mounted to a bearing site of the cross member of the frame and arranged at least in part in a hollow space of the cross member, with the frame being installed in a tuned-up version of the motor vehicle.

Thus, in a first assembly step for installing an axle bracket, a standard version of the axle bracket is provided initially and formed with additional bearing sites for possible attachment of a stiffening element. This standard version of the axle bracket can be used universally regardless of motorization of the vehicle. In a second assembly step, the basic axle bracket can be suited or individualized to the vehicle at hand, i.e. when the vehicle has a higher motorization, the basic axle bracket version can be complemented with a stiffening element as opposed to a situation in which a vehicle of low motorization is involved so that the provision of a stiffening element can be omitted.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
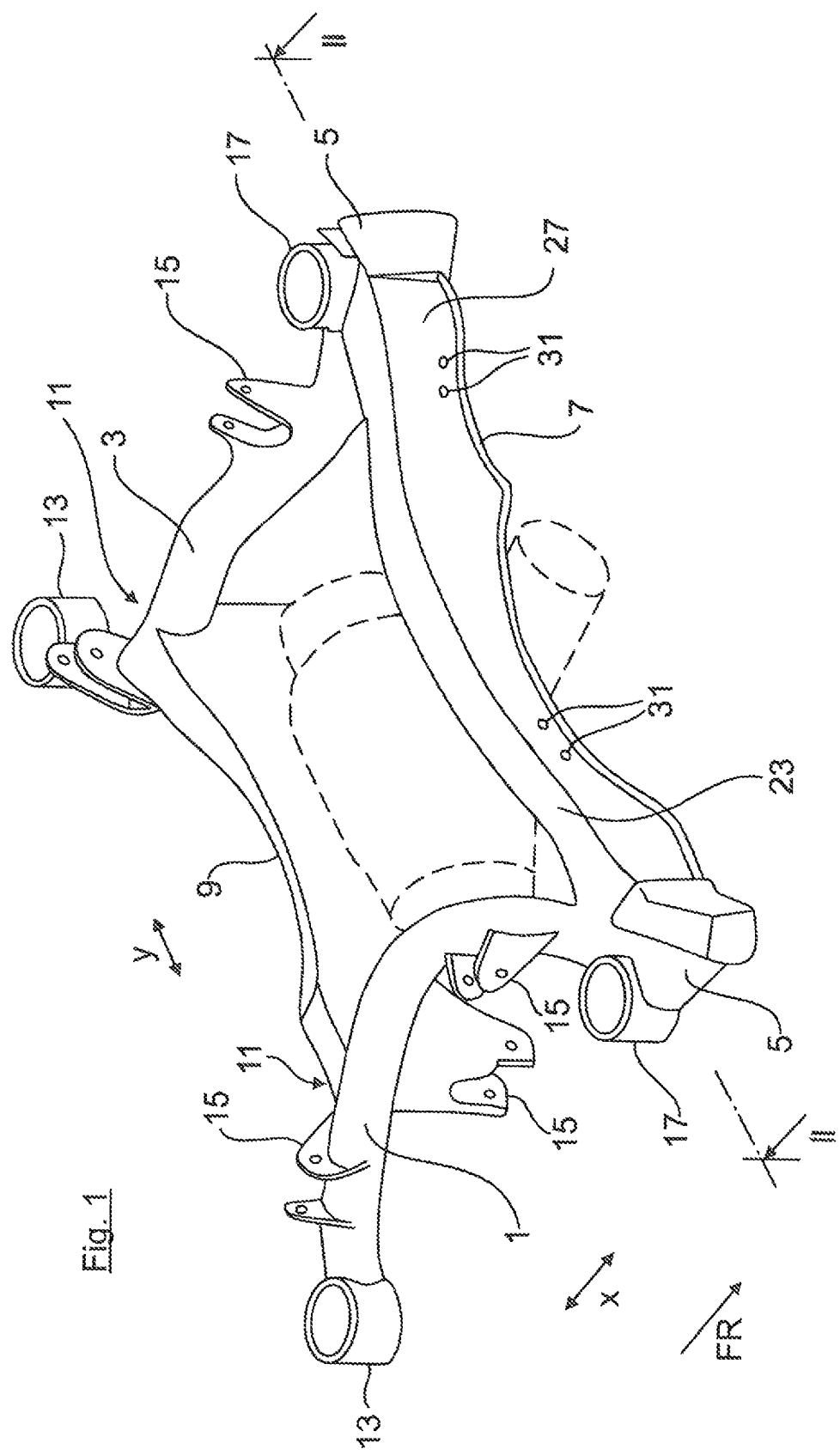
FIG. 1 is a perspective view of an axle bracket according to the present invention for use in a rear axle of a vehicle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of an axle bracket according to the present invention for use in a rear axle of a vehicle. The axle bracket carries a rear axle differential 19, indicated only in broken lines, which is connected to the front axle drive of the vehicle via a not shown cardan shaft. The axle bracket includes, as viewed in travel direction FR in longitudinal vehicle direction x, two side members 1, 3 in lateral opposing relationship. The side members 1, 3 are each connected at the front with corner pieces 5 which may be configured for example as box-shaped cast nodes. The corner pieces 5 connect both side members 1, 3 with a front cross member 7. To form a frame that is closed circumferentially, a rear cross member 9 is additionally provided which is attached to the two side members 1, 3 at further nodal points 11.

Figure 2:
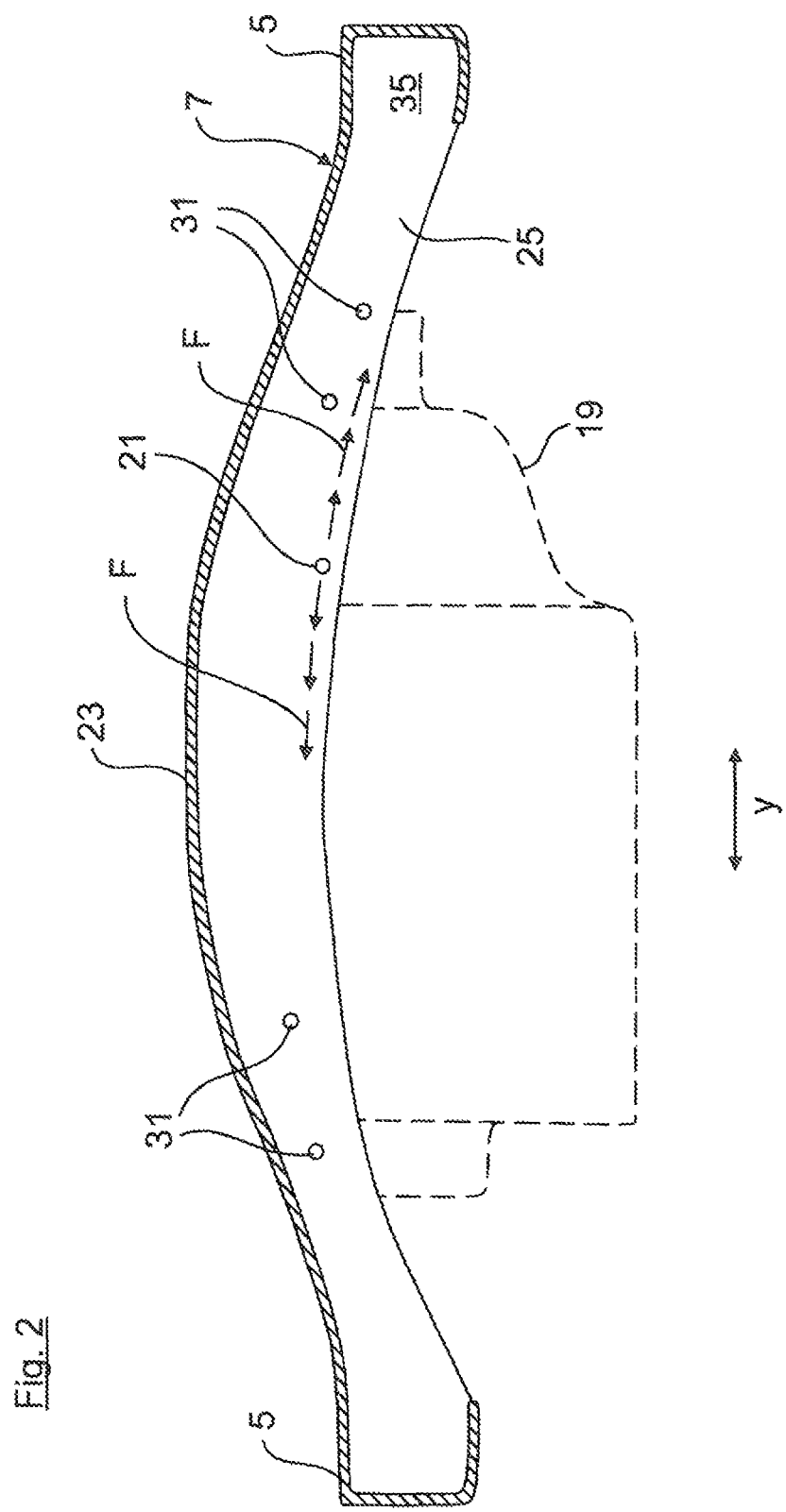
FIG. 2 is a sectional view of the axle bracket taken along the section line II-II in FIG. 1.
Figure 3:
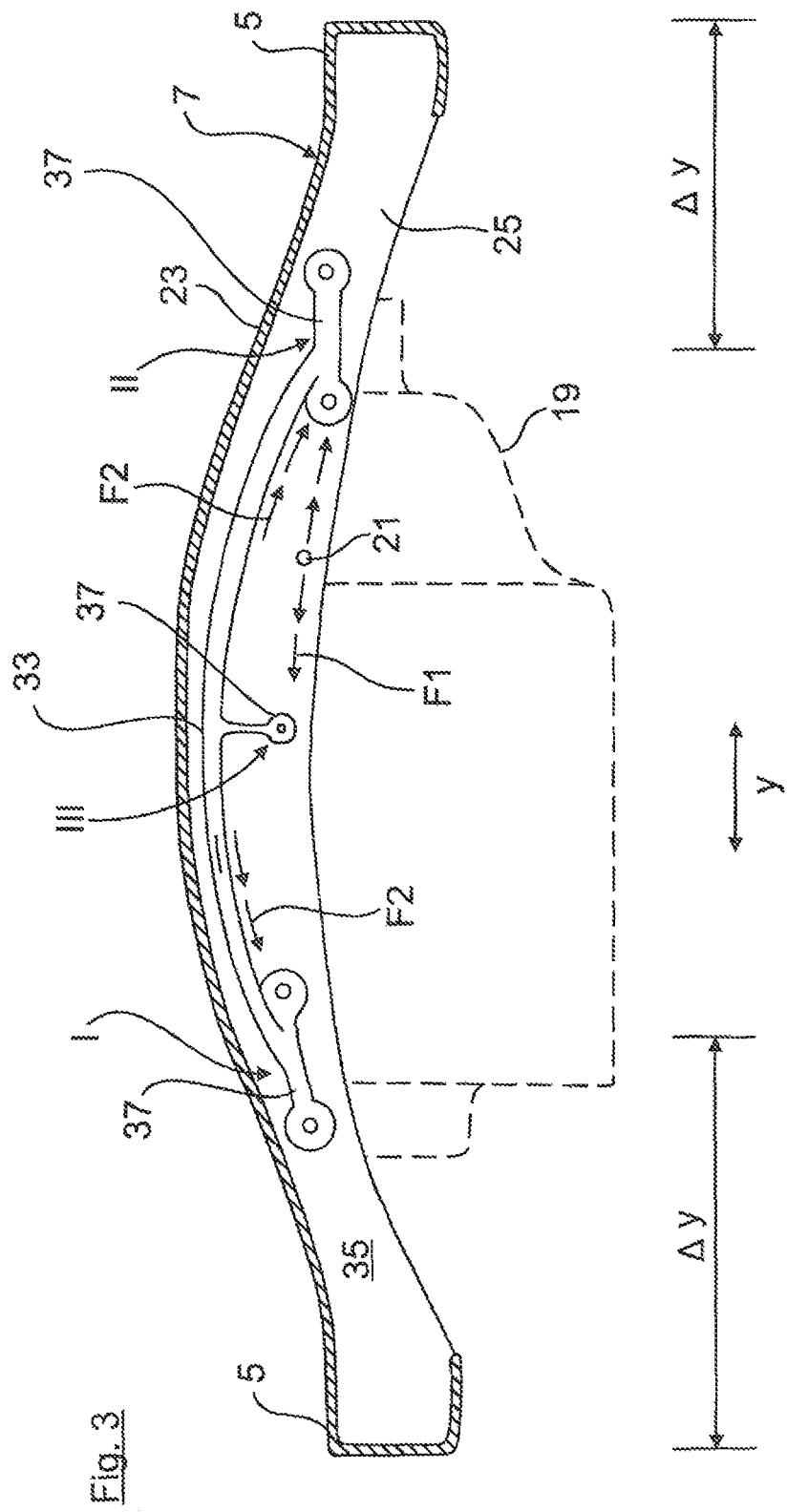
FIG. 3 is a sectional of the axle bracket corresponding to FIG. 2 with depiction of a stiffening element in one disposition.
Figure 4:
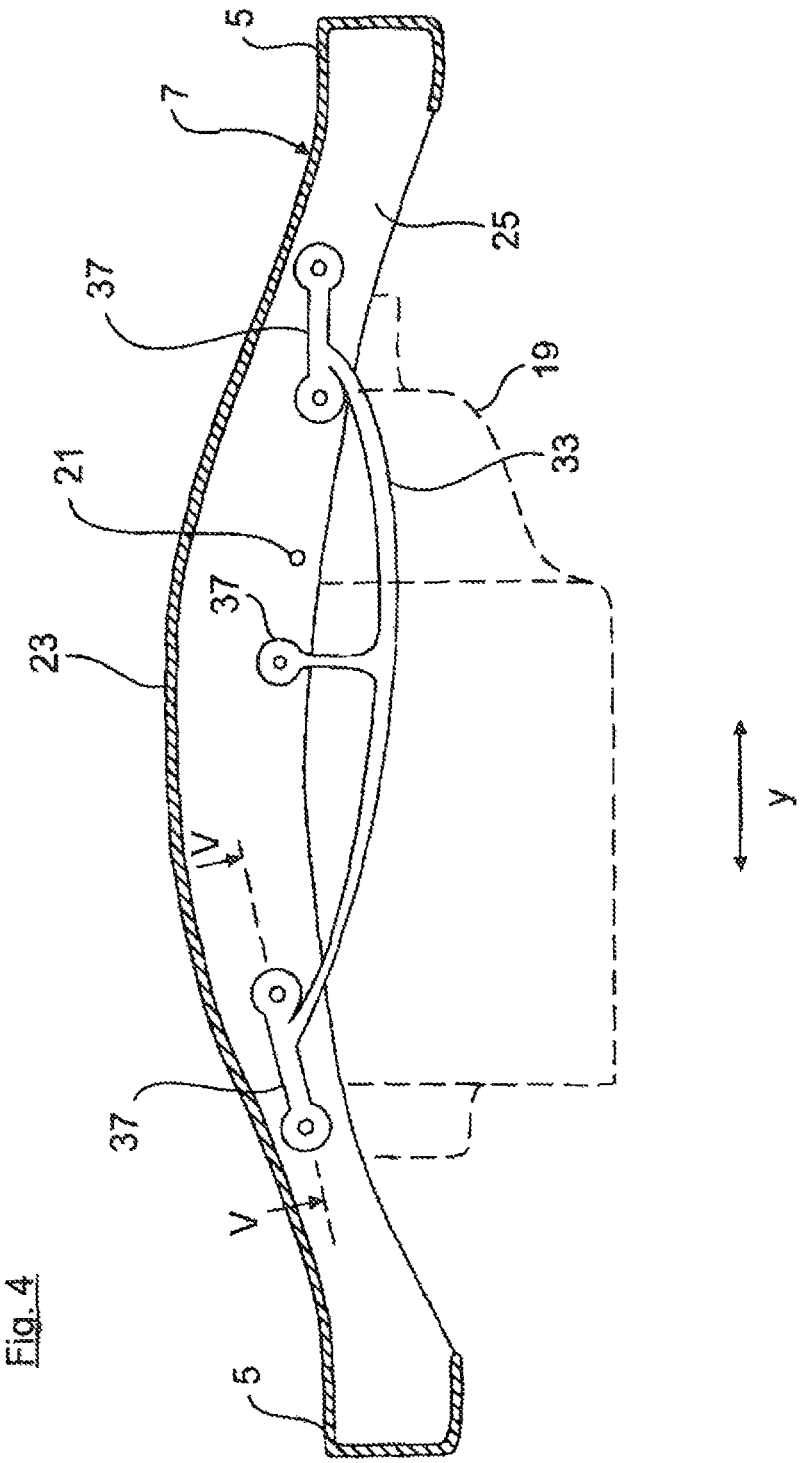
FIG. 4 is a sectional of the axle bracket corresponding to FIG. 2 with depiction of a stiffening element in another disposition.

According to FIG. 1, the two side members 1, 3 are extended to the rear in longitudinal vehicle direction x beyond the rear cross member 8 and provided at each of their ends with body-side attachment points 13, respectively, for attachment to a not shown body side member. Further provided on the side members 1, 3 in the longitudinal vehicle direction x towards the front are link mounts 15 and front body-side attachment points 17 for attachment to the side members of the body. The rear axle differential 19, shown only in broken lines in FIG. 1, is mounted within the frame-shaped axle bracket and installed to the front cross member 7 via a front attachment point 21 (FIGS. 2 to 4).

For weight-saving reasons, the front cross member 7 is configured in the form of a U-shaped hollow profile having an upper closed top wall 23 and sidewalls 25, 27 depending from the top wall 23 downwards. As can be seen in FIG. 2, the rear axle differential 19 is threadably engaged at the attachment point 21 with the rear sidewall 25 and the front sidewall 27 of the cross member 7. Both the rear sidewall 25 and the front sidewall 27 are provided with aligned screw holes 31 which define bearing sites for a stiffening element, e.g. in the form of a transverse strut (FIG. 3 or 4), as will be described further below, for threaded engagement to the front cross member 7.

During travel, operating forces are transmitted from the rear axle differential 19 via the attachment point 21 into the cross member 7. The cross member 7 provides hereby a load path F (FIG. 2) via which the operating forces are further transferred to the side members 1, 3. FIGS. 1 and 2 show a basic configuration of the axle bracket, as installed in vehicles of low motorization. Accordingly, the front cross member 7 is dimensioned to resist operating forces as at most encountered at low motorization.

When a vehicle is involved that has a higher motorization, the load path F as provided by the cross member 7 is no longer adequate to ensure a reliable transfer of the operating forces to the side members 1, 3. In order to increase the stiffness, a transverse strut 33 as stiffening element is mounted to the cross member 7, as shown in FIGS. 3 and 4. As shown in FIG. 3, the transverse strut 33 is threadably engaged with the screw holes 31 of the cross member 7, defining nodal points I, II. The two ends of the transverse strut 33 converge with the cross member 7 at the nodal points I, II. As can be further seen from FIG. 3, the two nodal points I, II are each inwardly offset by a transverse offset Δy from the outer corner pieces 5. In addition, the attachment point 21 for the rear differential axle 19 is positioned between the two nodal points I, II. The provision of the thus-mounted transverse strut 33 provides a second load path F2 (FIG. 3) via which operating forces can be transferred to the side members 1, 3 while decreasing the load on the cross member 7.

In the non-limiting examples of FIGS. 3 and 4, the transverse strut 33 is further secured at a third nodal point III to the cross member 7. The third nodal point III is disposed in transverse vehicle direction y between the outer nodal points I, II. Through appropriate disposition and/or number of nodal points I, II, III, the natural frequency of the axle bracket can be influenced.

Figure 5:
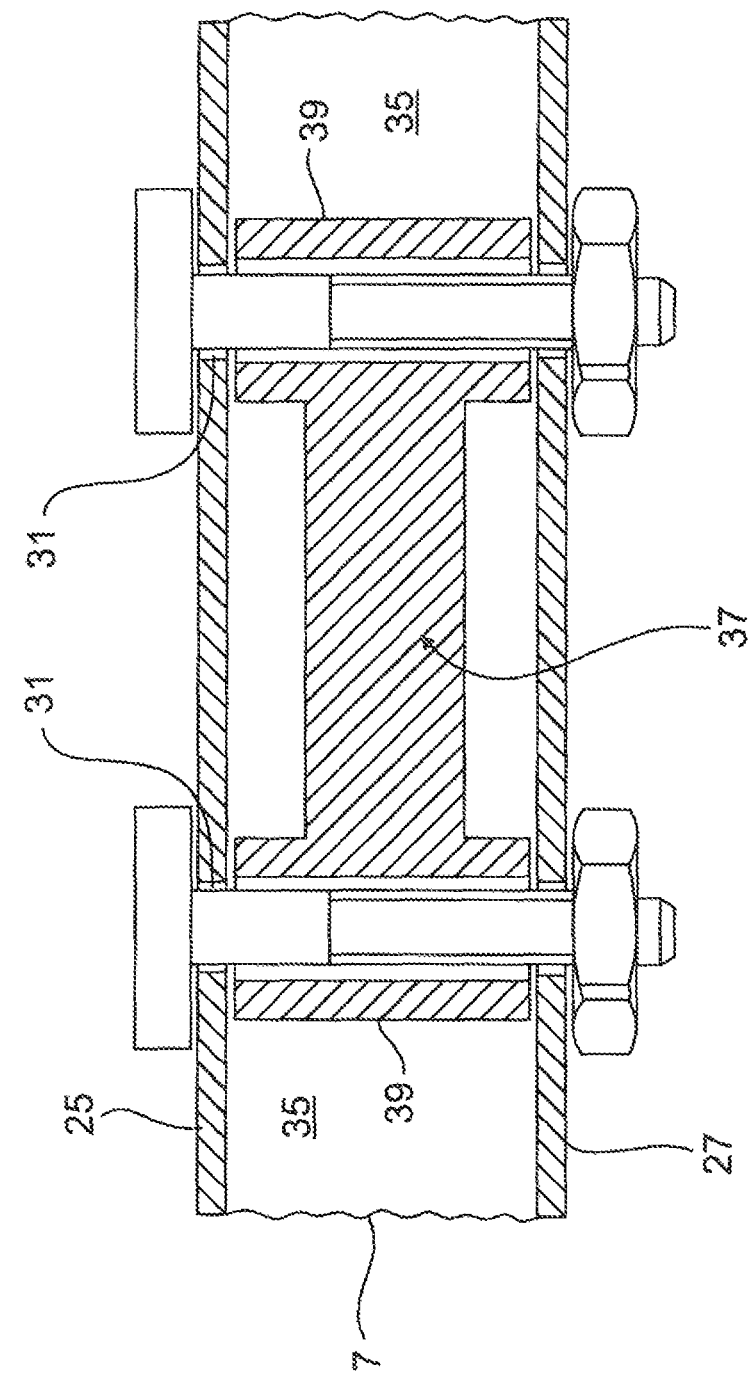
FIG. 5 is a sectional view of the axle bracket taken along the section line V-V in FIG. 4.

As can be seen from FIG. 3, the transverse strut 33 has a shape that substantially tracks the contour of the front cross member 7. The transverse strut 33 extends continuously within the hollow space 35 that is bounded by the cross member 7. The two ends of the transverse strut 33 have each mounts 37. Each mount 37 is a terminal bridge having two tubular lugs 39. When assembled, the tubular lugs 39 extend between the two sidewalls 25, 27 of the side member 7, as shown in FIG. 5. The lugs 39 are hereby in alignment with the opposing screw holes 31 of the cross member 7 and threadably connected to one another by a screw bolt and a fastening nut.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An axle bracket for a front axle or rear axle of a motor vehicle, said axle bracket comprising:
   two side members;
   at least one cross member interconnecting the side members and having at least one attachment point for attachment of a drive component, wherein during travel an operating force is introducible from the drive component via the attachment point to the cross member, said cross member constructed as a hollow profile of downwardly open U-shaped configuration to define a hollow space bounded by an upper top wall and two sidewalls depending downwards from the top wall, said cross member having a bearing site; and
   a stiffening element configured for securement to the bearing site such that the stiffening element is arranged, at least in part, in the hollow space of the cross member, for increasing a strength of the cross member.

2. The axle bracket of claim 1, wherein the stiffening element is a transverse strut.

3. The axle bracket of claim 1, wherein the drive component is a rear axle differential or an electric motor.

4. The axle bracket of claim 1, wherein the stiffening element extends in the hollow space along its entire length.

5. The axle bracket of claim 1, wherein the cross member is configured to provide a load path via which the operating force is introducible into the side members, said stiffening element configured to provide a further load path via which the operating force is introducible into the side members.

6. The axle bracket of claim 1, further comprising corner pieces configured to connect the cross member with the side members.

7. The axle bracket of claim 6, wherein the stiffening element is mounted to the cross member at at least one nodal point at a location where an end of the stiffening element converges with the cross member.

8. The axle bracket of claim 7, wherein the location of the at least one nodal point is inwardly offset in transverse travel direction by a transverse offset in relation to an adjacent one of the corner pieces.

9. The axle bracket of claim 1, further comprising a second cross member connected to free ends of the side members to establish a closed frame.

10. The axle bracket of claim 1, wherein the cross member has three nodal points for securement of the stiffening element, said three nodal points defining two outer nodal points in transverse travel direction and a central nodal point between the two outer nodal points.

11. The axle bracket of claim 10, wherein the attachment point for the drive component is positioned between the outer nodal points.

12. The axle bracket of claim 1, wherein the bearing site is a screw hole formed in the cross member, said stiffening element being threadably engaged in the screw hole for securement to the cross member.

13. The axle bracket of claim 12, wherein each of the sidewalls of the U-shaped cross member has a said screw hole for securement of the stiffening element to the cross member, said stiffening element having at least a mounting piece with at least one tubular lug for threaded engagement with the cross member.

14. The axle bracket of claim 1, wherein the stiffening element is configured to substantially conform to a contour of the cross member.

15. The axle bracket of claim 1, wherein the stiffening element is configured to substantially extend away from the cross member as viewed in a longitudinal vehicle direction.

16. A method of mounting an axle bracket to a front axle or rear axle of a motor vehicle, said method comprising:
   mounting two side members and at least one cross member, which is configured as a hollow profile of downwardly open U-shaped configuration, to form a frame;
   mounting a stiffening element to a bearing site of the at least one cross member of the frame at least in part in a hollow space of the at least one cross member; and
   installing the frame in a tuned-up version of the motor vehicle,
   wherein the stiffening element is secured to the cross member at three nodal points, defining two outer nodal points in transverse travel direction and a central nodal point between the two outer nodal points.

17. The method of claim 16, wherein the stiffening element is sized to extend in the hollow space of the cross member along its entire length.

18. The method of claim 16, further comprising connecting the cross member with the side members by corner pieces.

19. The method of claim 16, further comprising connecting a second cross member to free ends of the side members to close the frame.

20. The method of claim 16, wherein the stiffening element is mounted to the cross member at at least one nodal paint at a location where an end of the stiffening element converges with the cross member.

21. The method of claim 20, wherein the location of the at least one nodal point is inwardly offset in transverse travel direction by a transverse offset in relation to an adjacent one of the corner pieces.

22. The method of claim 16, wherein the attachment point for the drive component is positioned between the outer nodal points.

23. The method of claim 16, wherein the stiffening element is threadably engaged in a screw hole at the bearing site for securement to the cross member.

24. The method of claim 23, further comprising aligning the screw hole with a tubular lug in a mounting piece of the stiffening element side for threaded engagement of the stiffening element to the cross member.

* * * * *